United States Patent [19]

Lipinski

[11] Patent Number: 5,596,969
[45] Date of Patent: Jan. 28, 1997

[54] FLOW CONDITIONING GAS MASS SENSOR

[75] Inventor: Matthew M. Lipinski, Columbus, Ind.

[73] Assignee: Cummins Engine Company, Inc., Columbus, Ind.

[21] Appl. No.: 538,002

[22] Filed: Oct. 2, 1995

[51] Int. Cl.$^6$ ............................. G01F 1/68; F02M 21/04
[52] U.S. Cl. ..................... 123/494; 123/527; 73/204.22; 73/204.27; 73/204.21
[58] Field of Search ........................... 123/527, 494; 73/118.1, 118.2, 202.5, 204.21, 204.22, 204.27; 137/9, 101.19

[56] References Cited

U.S. PATENT DOCUMENTS

| 3,975,951 | 8/1976 | Kohama et al. | 123/494 |
|---|---|---|---|
| 4,361,119 | 11/1982 | Endo et al. | 123/494 |
| 4,537,172 | 8/1985 | Kanehara | 123/494 |
| 4,838,295 | 6/1989 | Smith et al. | 137/101.19 |
| 4,974,445 | 12/1990 | Arai et al. | 73/118.2 |
| 4,981,035 | 1/1991 | Hall | 73/204.21 |
| 4,982,602 | 1/1991 | Stiefel et al. | 73/118.2 |
| 5,014,552 | 5/1991 | Kamiunten | 73/204.21 |
| 5,081,866 | 1/1992 | Ochiai et al. | 73/204.21 |
| 5,220,830 | 6/1993 | Bonne | 73/204.21 |
| 5,329,908 | 7/1994 | Tarr et al. | 123/527 |
| 5,355,855 | 10/1994 | Saikalis | 123/527 |

Primary Examiner—Erick R. Solis
Attorney, Agent, or Firm—Sixbey, Friedman, Leedom & Ferguson; Charles M. Leedom, Jr.

[57] ABSTRACT

A gas mass flow sensor for sensing a flow of compressed natural gas into an internal combustion engine is disclosed including a main flow passage having an inlet and an outlet forming a flow passage for the flow of compressed natural gas to the internal combustion engine, a secondary flow passage positioned within the main flow passage, a compressed natural gas flow sensor positioned within the secondary flow passage for sensing the flow rate of compressed natural gas through the secondary passage and a compressed natural gas flow conditioner for conditioning the flow of compressed natural gas through at least the secondary flow passage. The compressed natural gas flow conditioner includes a plurality of screening elements positioned substantially transversed to a direction of the flow of compressed natural gas through the flow sensor and a plurality of spacers for spacing each of the adjacent screening elements from one another.

24 Claims, 5 Drawing Sheets

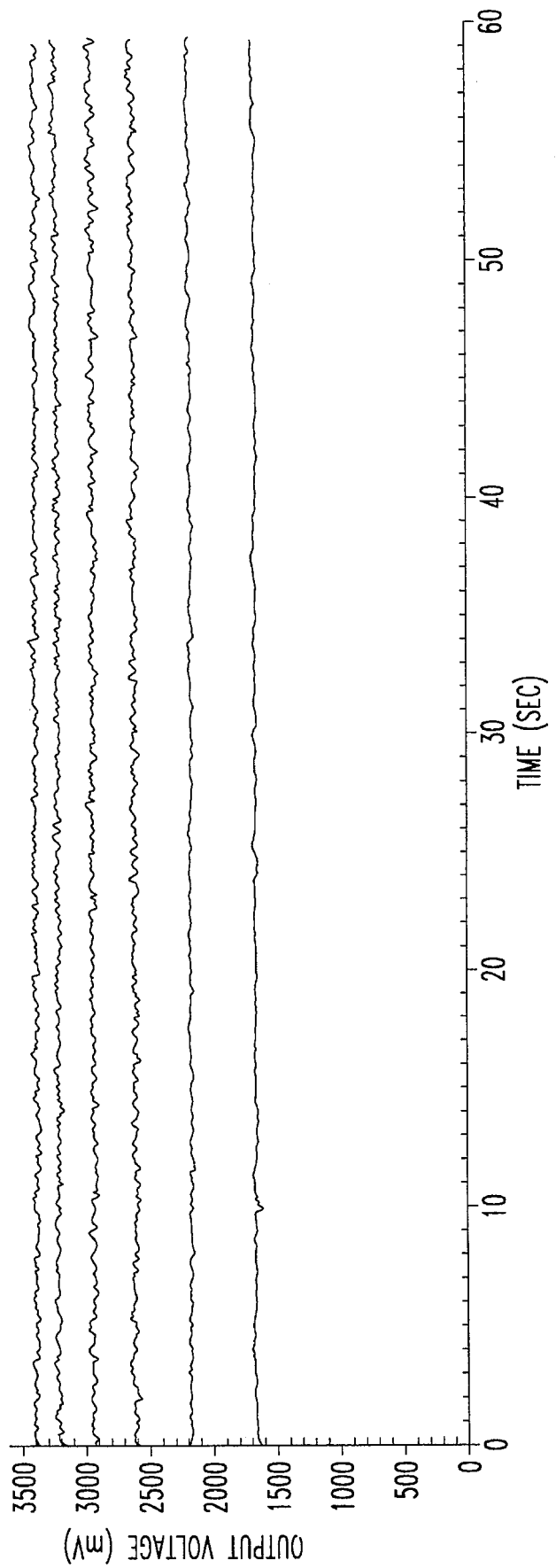

FLOW CONDITIONING GAS MASS SENSOR

TECHNICAL FIELD OF THE INVENTION

The present invention relates to a gas mass sensor for sensing the fuel flow into an engine. More particularly, the present invention is directed to a flow conditioning screen pack positioned adjacent a gas mass flow sensor for conditioning the flow of compressed natural gas into the sensor to provide a useable output signal.

BACKGROUND OF THE INVENTION

Presently, hot wire type flow meters are used in the internal combustion engine industry for measuring air flow into such engine. One such hot wire type air flow meter is disclosed in U.S. Pat. No. 4,974,445 issued to Arai et at. wherein the hot wire type air flow meter is used to detect and control the quantity of intake air into an internal combustion engine. Therein, it is noted that the hot wire type sensor is positioned within an intake air passage for obtaining an output signal corresponding to the total quantity of intake air by detecting the air flow velocity at this particular point. However, it is noted that the air passing over the hot wire sensor is not pressurized, thus, merely providing a single mesh screen at the inlet port leading to the flow meter is sufficient to reduce disorder from the air flow stream.

However, as can be noted from FIG. 7, when such a sensor is utilized in the fuel flow passage of a compressed natural gas internal combustion engine, significant noise is experienced to the point where the signal generated by the gas mass flow sensor is unusable.

Clearly, there is a need for a gas mass flow sensor for use in the fuel flow passage of a compressed natural gas fuel injected internal combustion engine wherein the quantity of gas passing through such fuel flow passage can be accurately detected by a hot wire type sensor thus generating a usable signal indicative of the flow of compressed natural gas passing therethrough.

SUMMARY OF THE INVENTION

A primary object of the present invention is to overcome the aforementioned shortcomings associated with related mass flow sensors.

A further object of the present invention is to provide a means for straightening and conditioning the flow of pressurized gas into the gas mass sensor.

A further object of the present invention is to provide a means for straightening and conditioning the flow of compressed natural gas into a gas mass sensor such that substantially all of the noise from the sensor signal is removed.

A still further object of the present invention is to provide a readily removable and changeable screen pack for straightening and conditioning the flow of compressed natural gas into a gas mass sensor.

An additional object of the present invention is to provide a unitary screen pack which is placed within a fuel flow passage of compressed natural gas to an internal combustion engine as a single unit.

These, as well as additional objects of the present invention, are achieved by providing a gas mass flow sensor for sensing a flow of compressed natural gas into an internal combustion engine including a main flow passage having an inlet and an outlet forming a flow passage for the flow of compressed natural gas to the internal combustion engine, a secondary flow passage positioned within the main flow passage, a compressed natural gas flow sensor positioned within the secondary flow passage for sensing the flow rate of compressed natural gas through the secondary passage and a compressed natural gas flow conditioner for conditioning the flow of compressed natural gas through at least the secondary flow passage. The compressed natural gas flow conditioner includes a plurality of screening elements positioned substantially transversed to a direction of the flow of compressed natural gas through the mass flow sensor and a plurality of spacers for spacing each of the adjacent screening elements from one another.

The plurality of screening elements as well as the plurality of spacers are accommodated in a unitary housing which is placed within the main flow passage adjacent the compressed natural gas flow sensor. The screening elements include a plurality of crossed wires having a density in the range of 80 wires/in$^2$ to 150 wires/in$^2$ and preferably approximately 120 wires/in$^2$. Additionally, it has been determined that ideally the fuel flow conditioner includes four screening elements which are spaced apart by spacers in the form of rings having an outer diameter substantially equal to the inner diameter of the unitary housing. In order to facilitate the manufacture of the natural gas flow conditioner, the unitary housing includes fixing tabs adjacent the inlet and outlet of the housing with the fixing tabs contacting a first and last screening element to maintain the screening elements and spacers in position within the unitary housing. Additionally, spacers can be provided between the screening elements and fixing tabs in order to provide substantially uniform pressure about an entire periphery of the housing. Further, it has been determined that each spacer space the respective screens in the range of approximately 20 to 100 thousands of an inch apart and preferably 63 thousands of an inch apart which results in an optimally conditioned gas flow.

BRIEF DESCRIPTION OF THE DRAWINGS

FIG. 8 is a graphical illustration of the output signal generated by the compressed natural gas flow sensor in accordance with the present invention.

DETAILED DESCRIPTION OF THE INVENTION

The present invention will now be described in detail with reference to the several figures. Initially, the overall system which incorporates the compressed natural gas flow sensor in accordance with the present invention will be described in detail.

Figure 1:
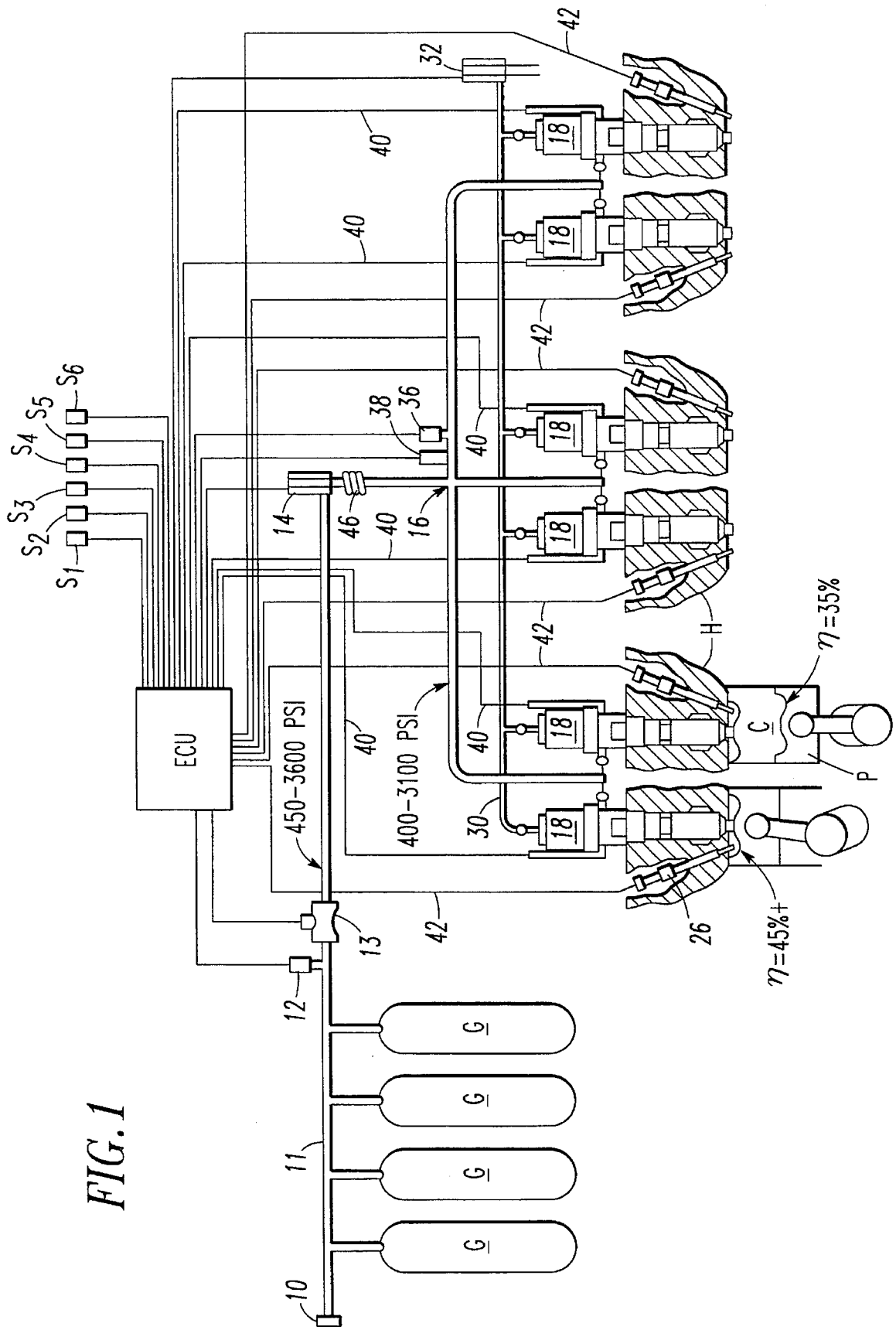
FIG. 1 is a schematic view of an overall system incorporating the compressed natural gas flow meter in accordance with the present invention.
Figure 2:
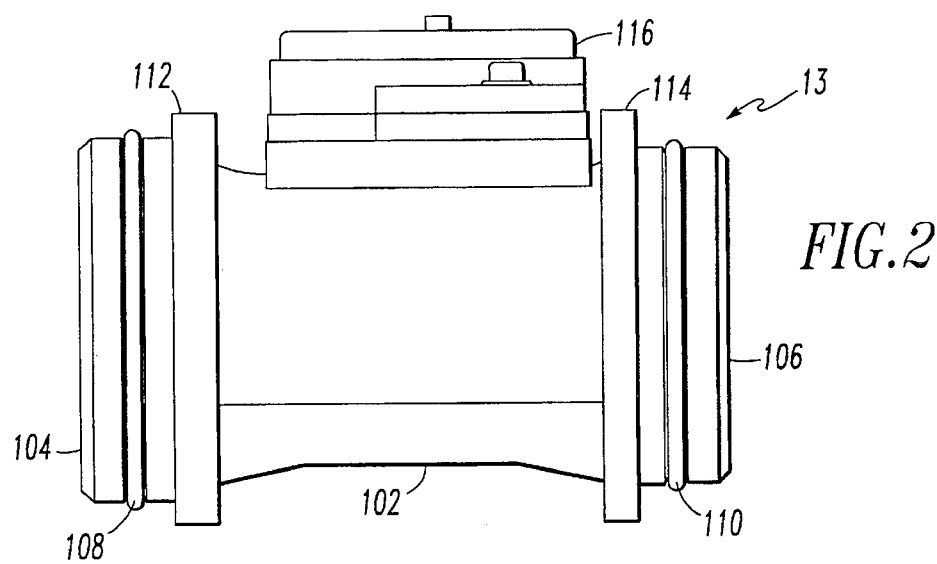
FIG. 2 is a side view of a housing which accommodates both the compressed natural gas flow conditioner and sensor in accordance with the present invention.

As is illustrated in FIG. 1, a supply of compressed natural gas is contained in a plurality of gas tanks G which can be refilled by way of a gas filling connector 10. Pressure in the gas line leading from the tanks will vary from around 3,600 PSIG when the tanks are fully charged and decreases to about 50 PSIG as the fuel supply is depleted. The actual pressure in the supply line 11 is measured by a gas supply pressure sensor 12. This signal being directed to the Electronic Control Unit (ECU). Downstream of the pressure sensor 12 is the compressed natural gas flow sensor 13 in accordance with the present invention. The signal generated by the flow sensor 13 indicative of the flow of compressed natural gas therethrough is likewise directed to the ECU. While the flow sensor 13 is illustrated as being directly in the supply line 11, a bypass passage may be provided with the flow sensor 13 positioned therein, if desired. Further, the flow sensor 13 may be in the form of multiple sensors positioned adjacent each injector.

A normally opened shut off and pressure regulator valve 14 closes the supply line 11 when the engine is inoperative and also serves as a pressure regulator by which gas pressure can be reduced under certain circumstances, if desired.

Downstream of the shut off and pressure regulator valve 14, a common distribution rail 16 connects the compressed natural gas supply line with a plurality of fuel injectors 18 (six such injectors being shown). Each of the injectors 18 is provided with a vent which vents the injector to a vent line 30. During operation of the engine, a solenoid shut off valve 32 will be opened allowing the leakage of gas to be vented to the air intake manifold of the engine, however, the shut off valve 32 closes when the engine is turned off in order to prevent a potentially dangerous accumulation of gas in the intake manifold.

The quantity of fuel injected is a function of the pressure of the gas and the time in which the injector valve is opened. The ECU receives indications of the supply pressure in the pressure line 11 from the supply pressure sensor 12, as well as a signal indicative of the gas flow rate of the compressed natural gas from the flow sensor 13 and the injection pressure and temperature of the gas in the distribution rail 16 from an injection pressure sensor 36 and a gas temperature sensor 38. Additionally, a series of sensors S1–S6 provide inputs to the ECU with respect to such engine parameters as accelerator pedal position, engine speed, coolant temperature, manifold pressure, altitude, and intake air temperature. Based on the inputs from the various sensors, the ECU in a manner which is conventional determines the appropriate quantity of fuel to be injected as well as the time that the injector valve must be opened to inject the calculated quantity of fuel. Likewise, at the appropriate times, signals are sent to the glow, spark plugs 26 by way of control line 42. Except for the mass flow sensor, such a compressed natural gas fuel injection system is set forth in detail in U.S. Pat. No. 5,329,908 issued to Tarr et at. and assigned to the assignee of the present application, the content of which is hereby incorporated herein by reference.

Referring now to FIGS. 2–6, the mass flow sensor 13 discussed briefly hereinabove will now be described in greater detail. The compressed natural gas flow sensor 13 includes a substantially cylindrical housing 102 which may be readily positioned within a compressed natural gas fuel line and includes an inlet 104 and an outlet 106. Adjacent both the inlet 104 and outlet 106 is a sealing ring 108 and 110 respectively, for providing sealing engagement between the housing 102 and the compressed natural gas fuel line accommodating the flow sensor 13. Stop flanges 112 and 114 are also provided for engaging the ends of the compressed natural gas fuel lines properly position the sensor 13. Secured to the housing 102 are the electrical components 116 as well as a hot wire type mass flow sensor. This being described in greater detail hereinbelow.

Figure 3:
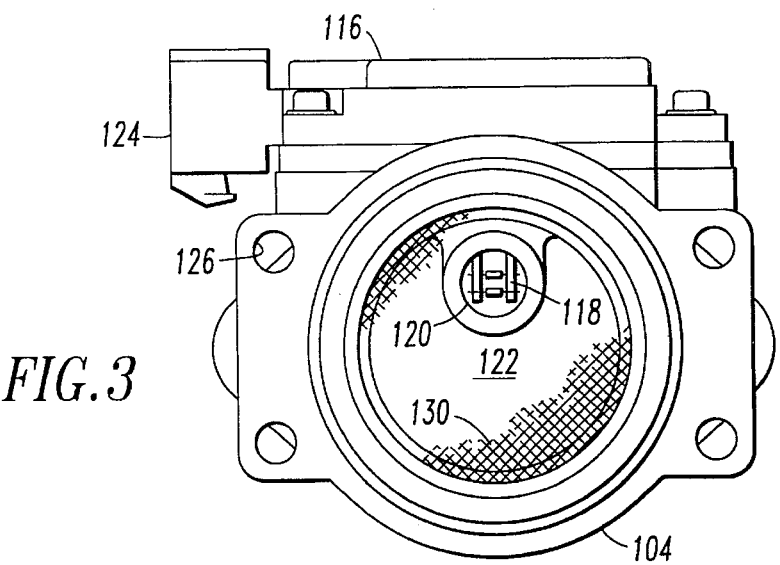
FIG. 3 is a front view of the housing illustrated in FIG. 2 looking into the inlet.
Figure 4:
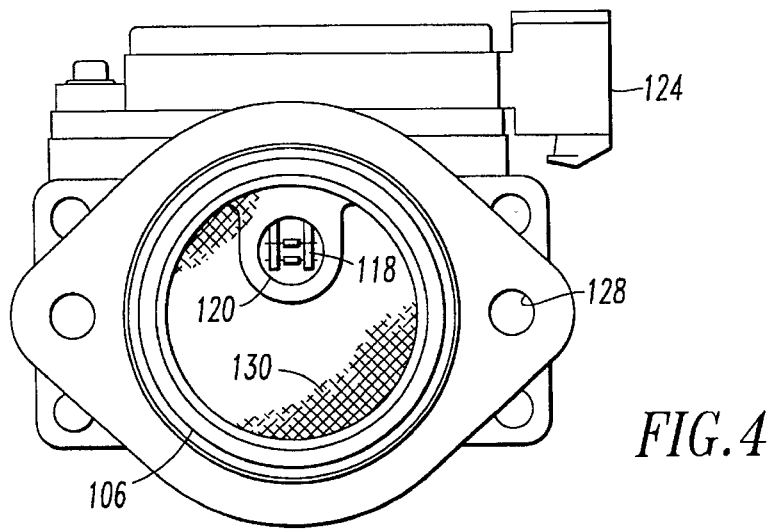
FIG. 4 is a rear view of the housing illustrated in FIG. 2 looking into the outlet of the housing.

Referring now to FIGS. 3 and 4, the hot wire type flow sensor 118 is readily visible through either the inlet 104 as illustrated in FIG. 3 or the outlet 106 as illustrated in FIG. 4. As can be appreciated from the end views, the hot wire type flow meter is positioned within a secondary flow passage 120 positioned within the main flow passage 122 formed between the inlet 104 and the outlet 106. The particular construction of the hot wire type flow meter will be discussed in greater detail hereinbelow with reference to FIG. 6. Again, as discussed hereinabove, the electronics 116 wire type flow meter are housed above the housing 102 and include an electrical connection 124 which provides both power to the hot wire type sensor as well as a return to the electronic control unit for a signal indicative of the mass flow rate through the sensor 13. Further, as can be seen from FIGS. 3 and 4, the flanges 112 and 114 include through holes 126 and 128, respectively which are provided for securing the housing 102 with respect to the compressed natural gas fuel fine by mating the through holes with through holes on the fuel line for securing the housing 102 in place. Upstream of the mass flow sensor 118 and positioned in the main flow passage 122 is a flow conditioning means in the form of a plurality of screens 130. The flow conditioning means will be described in greater detail hereinbelow with respect to FIGS. 5 and 6.

Figure 5:
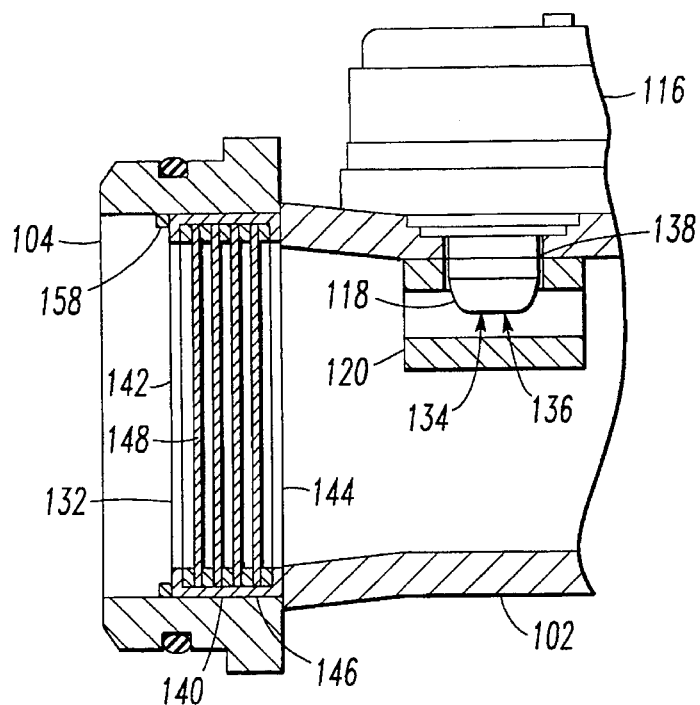
FIG. 5 is a cross-sectional view of the housing illustrated in FIG. 2 incorporating the compressed natural gas flow conditioner in accordance with the present invention.
Figure 6:
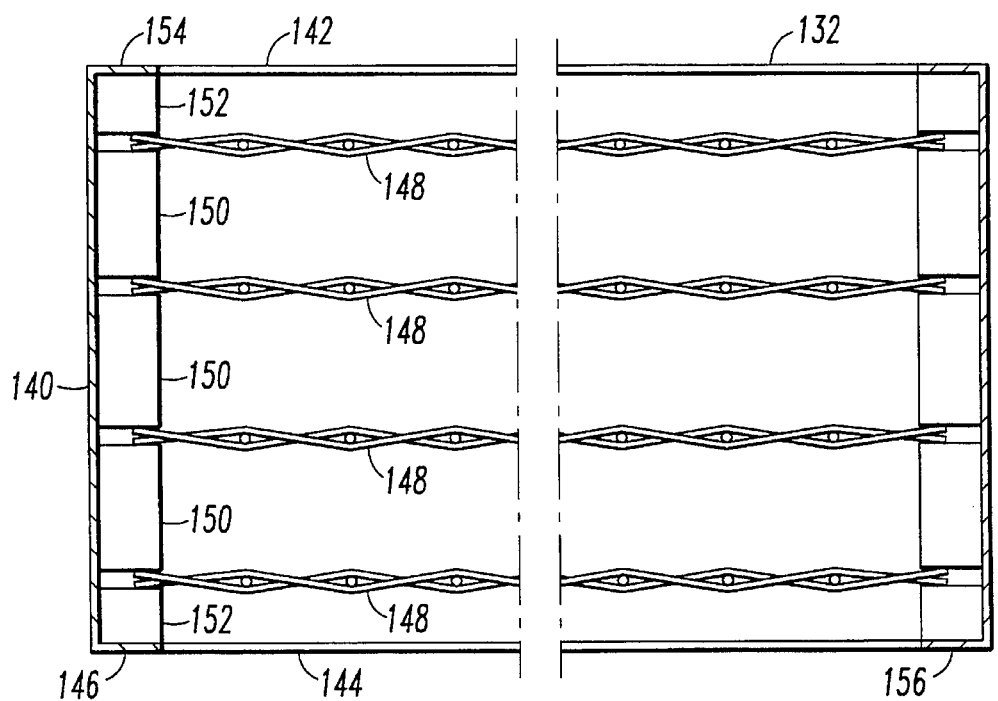
FIG. 6 is a cross-sectional view of the compressed natural gas flow conditioner in accordance with the present invention.

With reference now being made to FIGS. 5 and 6, the essence of the present invention will now be described in detail. Referring initially to FIG. 5, a cross-sectional view of the housing 102 of the hot wire type flow sensor 13 illustrates the positioning of the flow conditioning means 132. The flow conditioning means conditions the flow of the compressed natural gas passing through the inlet 104 of the housing 102. The flow conditioning means 132 being operatively positioned upstream of the hot wire type flow sensor 118. The hot wire type flow sensor 118 includes a hot wire element 134 and a temperature compensation element 136 formed integral with a detecting circuit 138 with the elements 134 and 136 being positioned within the secondary flow passage 120. This hot wire type flow sensor being similar to that discussed in U.S. Pat. No. 4,974,445 issued to Arai et at. However, it can be noted that the flow characteristics of air discussed therein are quite different than that of compressed natural gas to which the present invention is directed.

The flow conditioning means 132 is in the form of a screen pack 140 which is illustrated alone in FIG. 6. The screen pack itself includes an inlet 142 and an outlet 144 formed by an outer housing 146. The screen pack 140 includes a plurality of screens 148, each positioned transverse to the direction of flow of the compressed natural gas. Each of FIGS. 5 and 6 illustrate the screen pack 140 as including four screens 148 which has been found to be the optimum number of screens in order to condition the flow of the compressed natural gas pass the hot wire type flow sensor 118 in order to achieve a readable signal indicative of the mass flow rate of the compressed natural gas therethrough. Positioned between each of the screens 148 is a spacer 150 in the form a substantially continuous ring which secures each of the screens 148 in position with respect to one another. Each of the screens 148 are positioned in the range of approximately 20 to 100 thousands of an inch apart by the spacers and are optimally positioned approximately 63 thousands of an inch apart. This spacing between the individual screens 148 is critical in achieving a usable signal indicative of the mass flow rate of compressed natural gas passing through the sensor 13. Also, positioned adjacent the inlet 142 and outlet 144 are spacers 152 which may be utilized in order to space the first and last screen from the outlet and to provide a flush surface for the housing 140.

In this regard, the housing 146 is of a thin metal construction having the ends 154 and 156 crimped in a manner so as to sandwich the screens 148 and spacers 150 and 152 within the housing, thereby forming a unit which can be readily positioned within the inlet 104 of the housing 102. Once the flow conditioning means 132 is positioned within the inlet 104 of the housing 102, a pressure fitting 158 is inserted into the inlet 104 in order to secure the flow conditioner 132 in position. By positioning the flow conditioning means 132 upstream of the hot wire type flow sensor with the flow conditioning means including four mesh screens 148 spaced 63 thousands of an inch apart by the spacers 150, an accurate signal indicative of the mass flow rate of the compressed natural gas through the housing 102 can be achieved.

Figure 7:
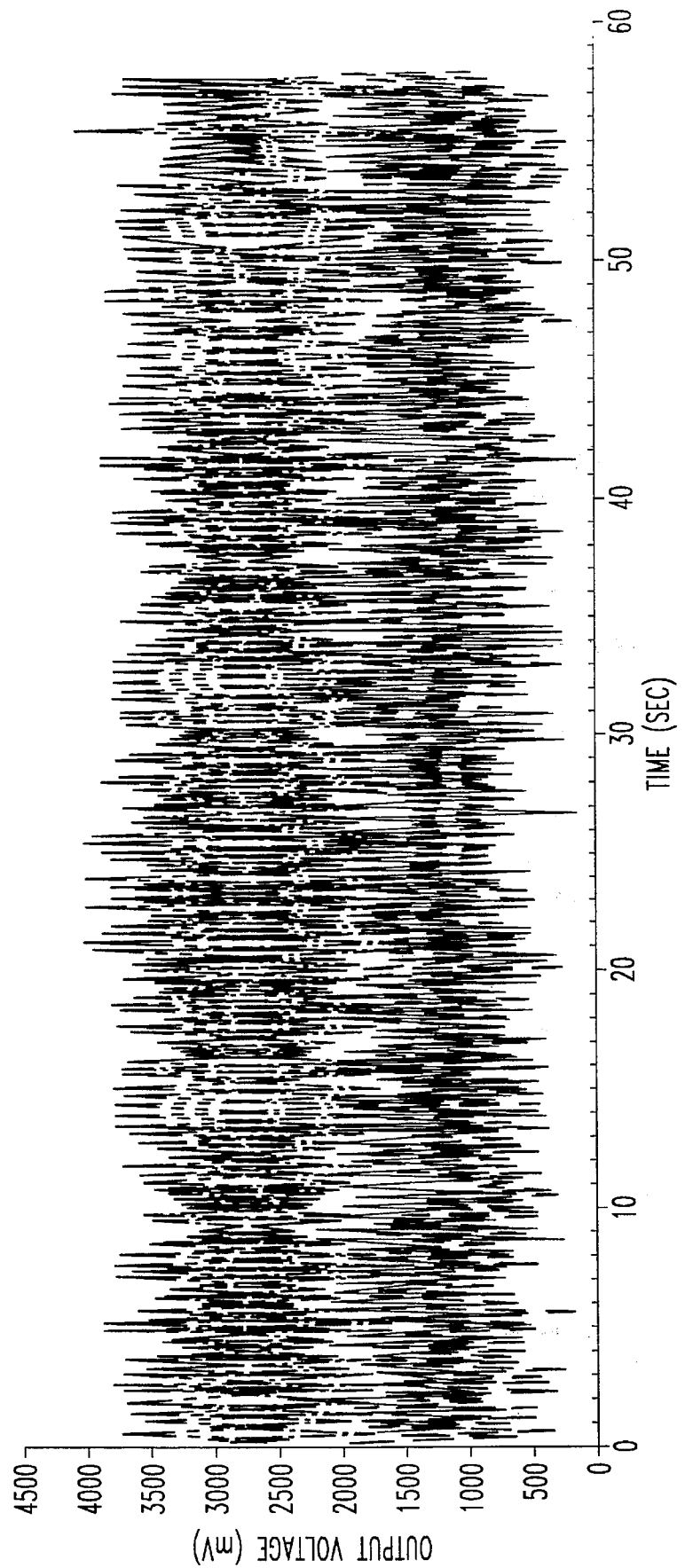
FIG. 7 is a graphical illustration of the signal produced by prior art flow sensors incorporated into a compressed natural gas flow passage.

Referring now to FIGS. 7 and 8, FIG. 7 illustrates the signal transmitted to the electronic control unit when the flow conditioning means 132 is not in place. As can be seen from FIG. 7, for each of the several flow rates, the signal received from the flow meter is substantially unusable due to the extreme amount of noise in the signal.

With the flow conditioning means 132 in the form of the screen pack 140 positioned in the inlet 104 of the housing 102, the signal generated by the hot wire type flow sensor is clear and substantially noise free. This is achieved by providing the screen pack 140 having four mesh screens 148 positioned by the spacers 150 at approximately 63 thousands of an inch apart. In doing so, the compressed natural gas flow through the flow meter is straightened and conditioned in a manner that permits the hot wire type flow sensor to generate a usable signal for operation of the compressed natural gas fuel injection system similar to that described hereinabove with respect to FIG. 1.

While the invention has been described with reference to a preferred embodiment, it should be appreciated by those skilled in the art that the invention may be practiced otherwise than as specifically described herein and without departing from the spirit and scope of the invention. It is therefore, to be understand that the spirit and scope of the invention being limited only by the appended claims.

I claim:

1. A flow sensor for sensing a flow of pressurized gaseous fuel to an internal combustion engine comprising:

a main flow passage having an inlet and an outlet forming a flow passage for the flow of pressurized gaseous fuel to the internal combustion engine;

a secondary flow passage positioned within said main flow passage;

a fuel flow sensing means positioned in said secondary flow passage for sensing a flow rate of pressurized gaseous fuel through said secondary passage; and a pressurized gaseous fuel flow conditioning means for conditioning the flow of pressurized gaseous fuel through at least said secondary flow passage; said pressurized gaseous fuel flow conditioning means including;

a plurality of screening elements positioned substantially transverse to a direction of the pressurized gaseous fuel flow passing through said main flow passage; and a plurality of spacing means for spacing adjacent screening elements from one another, said spacing means spacing said screening elements in a range of 20 to 100 thousandths of an inch from one another.

2. The flow sensor as defined in claim 1, wherein said secondary flow passage extends in substantially the same direction as said main flow passage.

3. The flow sensor as defined in claim 1, wherein said pressurized gaseous fuel flow sensing means is a hot wire element.

4. The flow sensor as defined in claim 3, further comprising a detecting circuit integrally connected to said hot wire element for generating a signal indicative of the flow rate of pressurized gaseous fuel through said main flow passage.

5. The flow sensor as defined in claim 1, further comprising a unitary housing means for housing said plurality of screening elements and said plurality of spacing elements.

6. The flow sensor as defined in claim 5, wherein said unitary housing means includes an inlet and an outlet forming a passage therethrough.

7. The flow sensor as defined in claim 6, wherein said screening elements are positioned substantially transverse to a longitudinal direction of said passage.

8. The flow sensor as defined in claim 1, wherein said screening elements include crossed wires, said screening elements having a density in a range of 80 wires/in$^2$ to 150 wires/in$^2$.

9. The flow sensor as defined in claim 8, wherein said screening elements have a density of approximately 120 wires/in$^2$.

10. The flow sensor as defined in claim 1, wherein said pressurized gaseous fuel flow conditioning means includes at least four screening elements.

11. The flow sensor as defined in claim 5, wherein said unitary housing means includes at least four screening elements, each screening element spaced from an adjacent screening element by one of said spacers.

12. The flow sensor as defined in claim 1, wherein said screening elements are spaced 63 thousandths of an inch from one another by said respective spacers.

13. The flow sensor as defined in claim 11, wherein said unitary housing is a substantially cylindrical housing and is received in the inlet of said main flow passage.

14. The flow sensor as defined in claim 13, wherein said spacers are rings having an outer diameter substantially equal to an inner diameter of said unitary housing.

15. The flow meter as defined in claim 14, wherein said unitary housing includes fixing tabs adjacent the inlet and the outlet of said housing, said fixing tabs contacting a first and a last screening element to maintain said screening elements and said spacers in position within said unitary housing.

16. In a flow sensor for metering a flow of pressurized gaseous fuel to an internal combustion engine having a main flow passage, a secondary flow passage and a pressurized gaseous fuel flow sensor, a pressurized gaseous fuel flow conditioning means for conditioning the flow of fuel comprising:

a unitary housing having an inlet and an outlet, said unitary housing being in the form of a removable cartridge;

a plurality of screening elements secured in said unitary housing and positioned substantially transverse to a passage in said unitary housing between said inlet and said outlet; and a plurality of spacing means in said unitary housing for spacing adjacent screening elements from one another;

wherein said flow conditioning means is positioned in at least one of the main flow passage and the secondary flow passage for conditioning the flow of pressurized gaseous fuel passing the pressurized gaseous fuel flow sensor.

17. The flow sensor as defined in claim 16, wherein said screening elements include crossed wires, said screening elements having a density in a range of 80 wires/in$^2$ having a density in a range of 80 wires/in$^2$ to 150 wires/in$^2$.

18. The flow sensor as defined in claim 17, wherein said screening elements have a density of approximately 120 wires/in$^2$.

19. The flow sensor as defined in claim 16, wherein said unitary housing means includes at least four screening elements, each screening element spaced from an adjacent screening element by one of said spacers.

20. The flow sensor as defined in claim 19, wherein said screening elements are spaced in a range of 20 to 100 thousandths of an inch from one another by respective spacers.

21. The flow sensor as defined in claim 20, wherein said screening elements are spaced 63 thousandths of an inch from one another by said respective spacers.

22. The flow sensor as defined in claim 16, wherein said unitary housing is a substantially cylindrical housing and is received in the inlet of said main flow passage.

23. The flow sensor as defined in claim 22, wherein said spacers are rings having an outer diameter substantially equal to an inner diameter of said unitary housing.

24. The flow sensor as defined in claim 23, wherein said unitary housing includes fixing tabs adjacent the inlet and the outlet of said housing, said fixing tabs contacting a first and a last screening element to maintain said screening elements and said spacers in position within said unitary housing.

* * * * *